(12) United States Patent
Shiue et al.

(10) Patent No.: US 7,448,912 B1
(45) Date of Patent: Nov. 11, 2008

(54) MULTI-IN-ONE CARD CONNECTOR THAT ALLOWS INSERTION OF ONLY ONE SINGLE CARD AT A TIME

(75) Inventors: Gwo-Bin Shiue, Taipei (TW); Yaw-Huey Lai, Taipei (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/987,944

(22) Filed: Dec. 6, 2007

(30) Foreign Application Priority Data

Oct. 11, 2007 (TW) .............................. 96217007 U

(51) Int. Cl.
*H01R 24/00* (2006.01)
(52) U.S. Cl. ....................................... 439/630; 439/946
(58) Field of Classification Search .................. 439/630, 439/946
See application file for complete search history.

(56) References Cited

U.S. PATENT DOCUMENTS

| | | | |
|---|---|---|---|
| 6,900,982 B2 * | 5/2005 | Chang et al. ................ | 361/685 |
| 6,908,321 B1 | 6/2005 | Lai | |
| 6,974,350 B1 * | 12/2005 | Chen ........................... | 439/630 |
| 7,011,549 B1 * | 3/2006 | Lai .............................. | 439/630 |
| 7,044,757 B1 * | 5/2006 | Yen ............................. | 439/138 |
| 7,118,420 B1 * | 10/2006 | Lai et al. ..................... | 439/630 |
| 7,121,894 B2 * | 10/2006 | Lin ............................. | 439/630 |
| 2006/0079132 A1 * | 4/2006 | Ko .............................. | 439/630 |
| 2006/0276082 A1 * | 12/2006 | Hung et al. ................. | 439/630 |
| 2007/0218770 A1 * | 9/2007 | Kikuchi et al. ............. | 439/630 |

* cited by examiner

*Primary Examiner*—Hae Moon Hyeon
(74) *Attorney, Agent, or Firm*—Bacon & Thomas, PLLC

(57) ABSTRACT

A multi-in-one card connector includes a base having two upright sidewalls and a downwardly backwardly extending sloping groove at each upright sidewall, and two slanting, two terminal sets mounted in the base at different elevations, a partition plate mounted in the base and movable along the downwardly backwardly extending sloping grooves of the upright sidewalls between two positions to control insertion of only one single card member into contact with one terminal set in the base, a cover plate covering the base, and two spring members connected between the base and the partition plate to support the partition plate in one of the two positions.

10 Claims, 9 Drawing Sheets

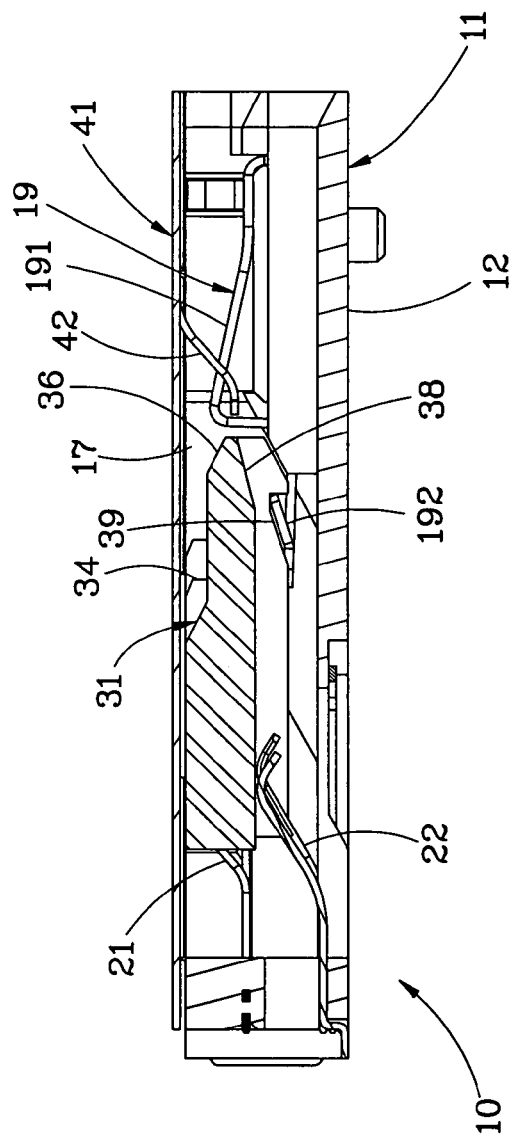
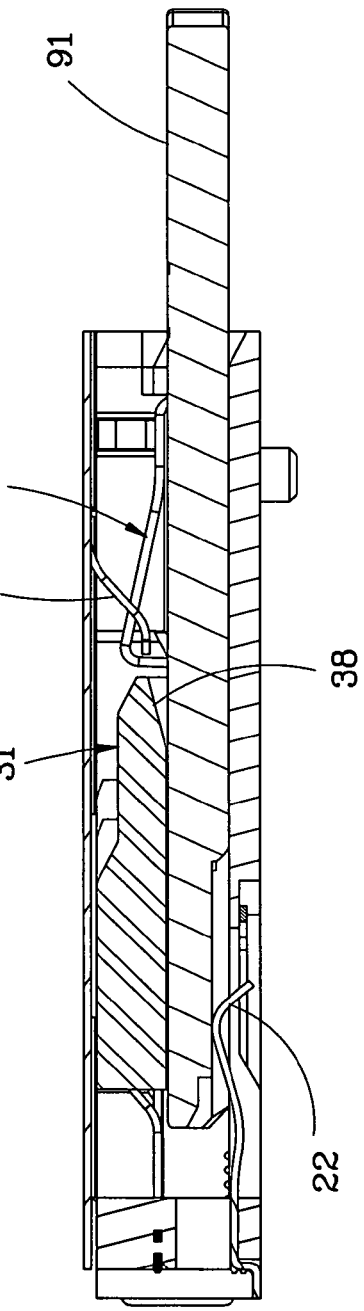
FIG. 7
FIG. 8

US 7,448,912 B1

MULTI-IN-ONE CARD CONNECTOR THAT ALLOWS INSERTION OF ONLY ONE SINGLE CARD AT A TIME

BACKGROUND OF THE INVENTION

1. Field of the Invention

The present invention relates to electrical connection devices and more particularly, to a multi-in-one card connector that allows insertion of only one single card member.

2. Description of the Related Art

Various multi-in-one card connectors have been disclosed for use with a card reader to fit different card members. In order to prevent a reading error due to insertion of multiple cards at a time, multi-in-one card connectors that allow insertion of only one card member are created.

U.S. Pat. No. 6,908,321 discloses a card connector entitled All-in-one connector in which an all-in-one card connector is comprised of a base, two plate-like members, and a plurality of terminals. The base has an opening formed at a front end thereof, two lateral sections formed respectively at bilateral sides of the opening, a concavity formed at one lateral section, a movable guide member mounted in the concavity fro upward and downward movement respectively for blocking a large width card and a small width card, and a springy member mounted between the guide member and the base for generating resilience keeping movement of the guide member. The base is mounted closely between the two plate-like members. Each of the terminals is mounted on the plate-like member and extends into the opening to be electrically connected with contact pads of an inserted electronic card. Accordingly, when an electronic card is inserted into the card connector, the guide member allows the entry of the card to be pushed by the card to move towards a direction to further stop entry of another card.

According to the aforesaid prior art design, the guide member is moved vertically up and down to control insertion of a card member into the space above or below. Therefore, the guide member requires a big vertical space. This limitation is not in favor of a low profile design.

SUMMARY OF THE INVENTION

The present invention has been accomplished under the circumstances in view. It is one object of the present invention to provide a multi-in-one card connector that prohibits insertion of a second card member after insertion of one first card member.

It is another object of the present invention to provide a multi-in-one card connector that selectively locks a partition plate to prevent an error during insertion of a card member.

To achieve these and other objects of the present invention, the multi-in-one card connector comprises a base, the base comprising two upright sidewalls and a front insertion opening defined between the upright sidewalls, the upright sidewalls each having at least one stepped portion; at least two terminal sets respectively mounted inside the base at different elevations; a partition plate mounted in and movable inside the base; and a cover plate covering the base. The upright sidewalls of the base each have a downwardly backwardly extending sloping groove for guiding movement of the partition plate inside the base, and the stepped portions of the base define the front opening of the base into at least two entrances for the insertion of at least two different specifications of card members into the base. The partition plate is set between two vertically spaced terminal sets of the at least two terminal sets, having two opposite side edges respectively supported in the downwardly backwardly extending sloping grooves of the upright sidewalls of the base to guide movement of the partition plate forwards and backwards relative to the base between an upper limit position and a lower limit position. Further, two spring members are connected between the partition plate and the base to impart a forward pressure to the partition plate.

BRIEF DESCRIPTION OF THE DRAWINGS

FIG. 7 is a schematic sectional view of the present invention, showing the relationship between the spring hooks and the partition plate.

FIG. 8 is a schematic sectional view of the present invention, showing a MS Duo card inserted into the multi-in-one card connector.

DETAILED DESCRIPTION OF THE INVENTION

Figure 1:
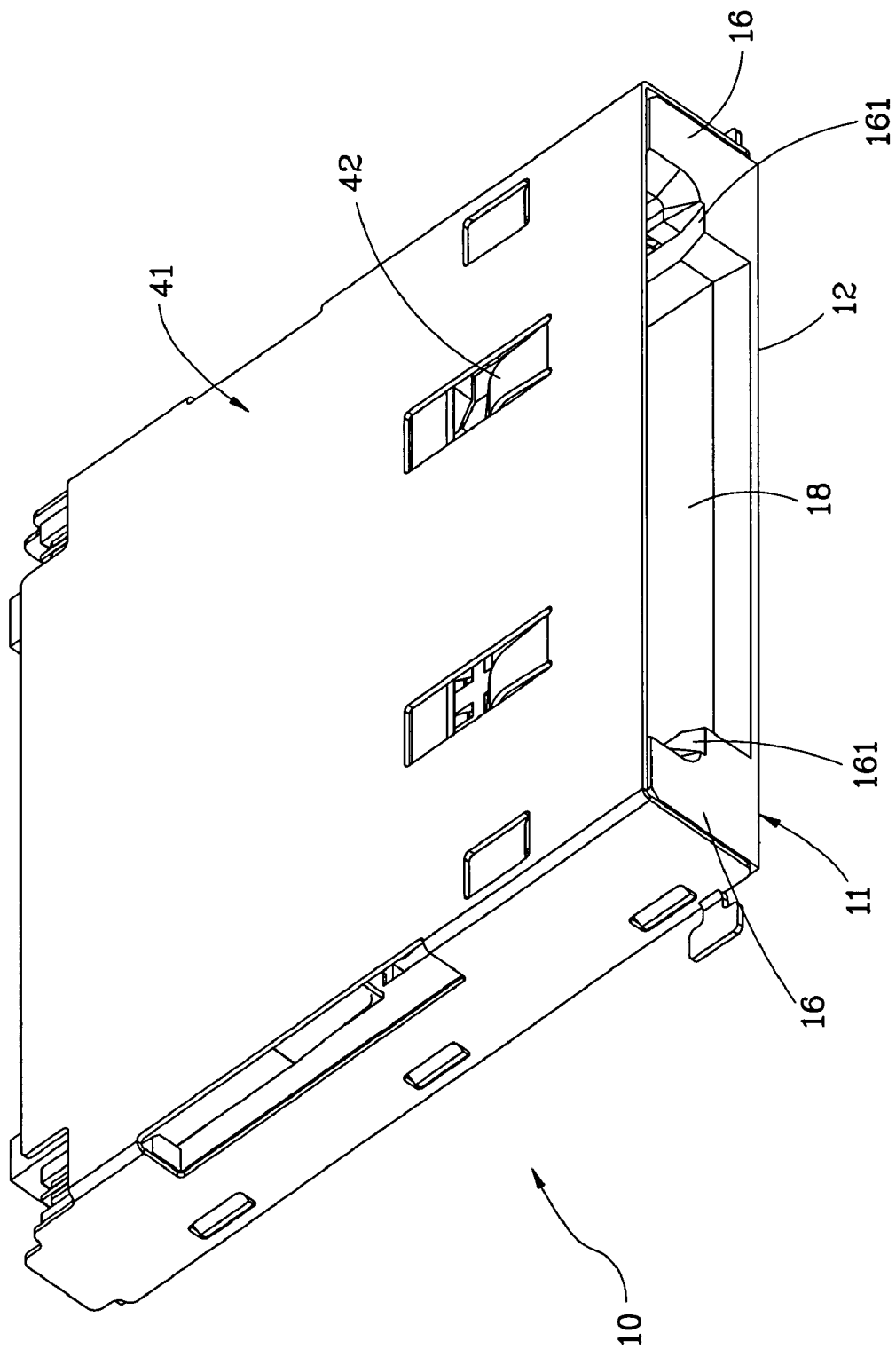
FIG. 1 is an oblique top elevation of a multi-in-one card connector in accordance with the present invention.
Figure 2:
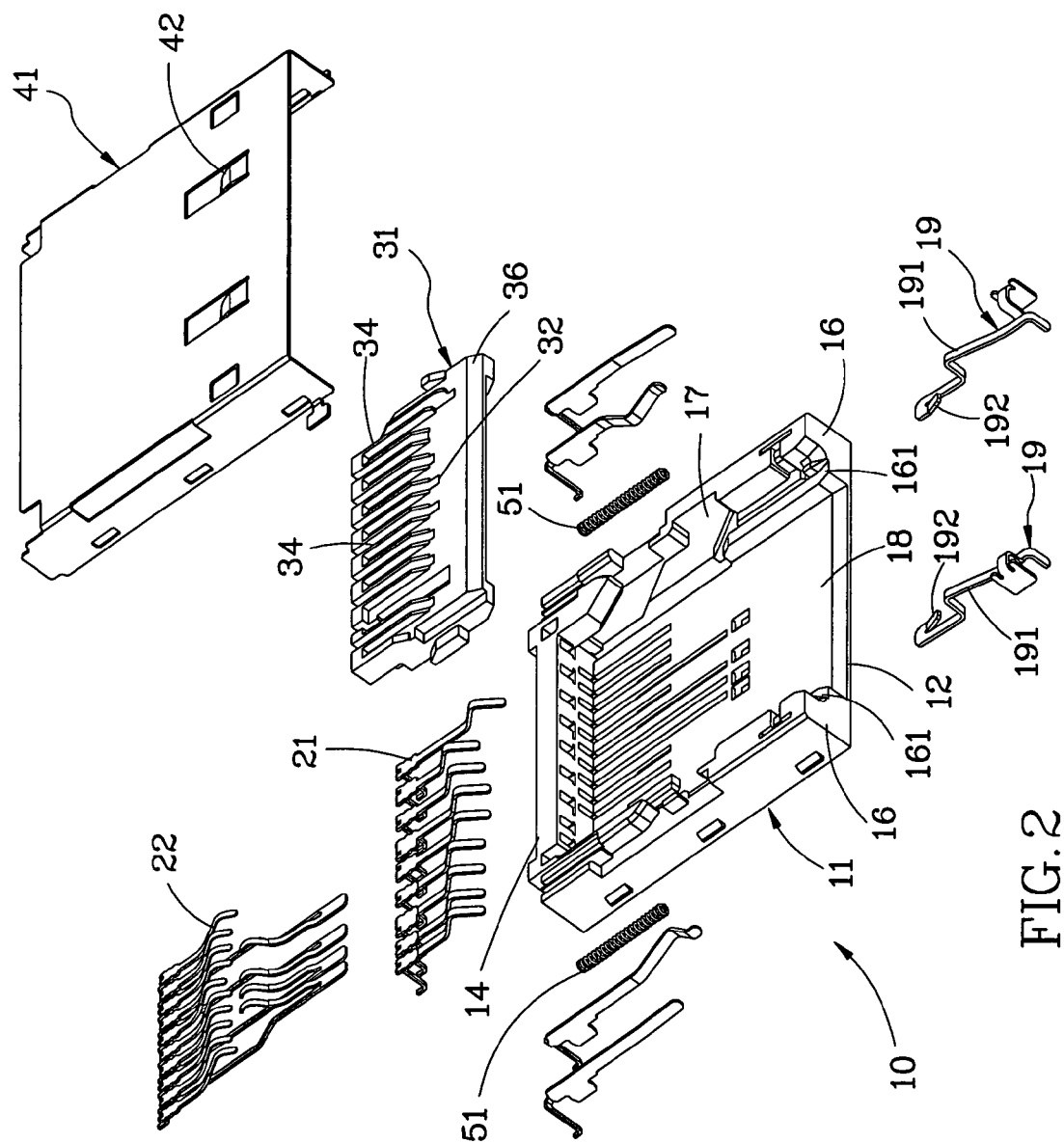
FIG. 2 is an exploded view of the multi-in-one card connector in accordance with the present invention.
Figure 3:
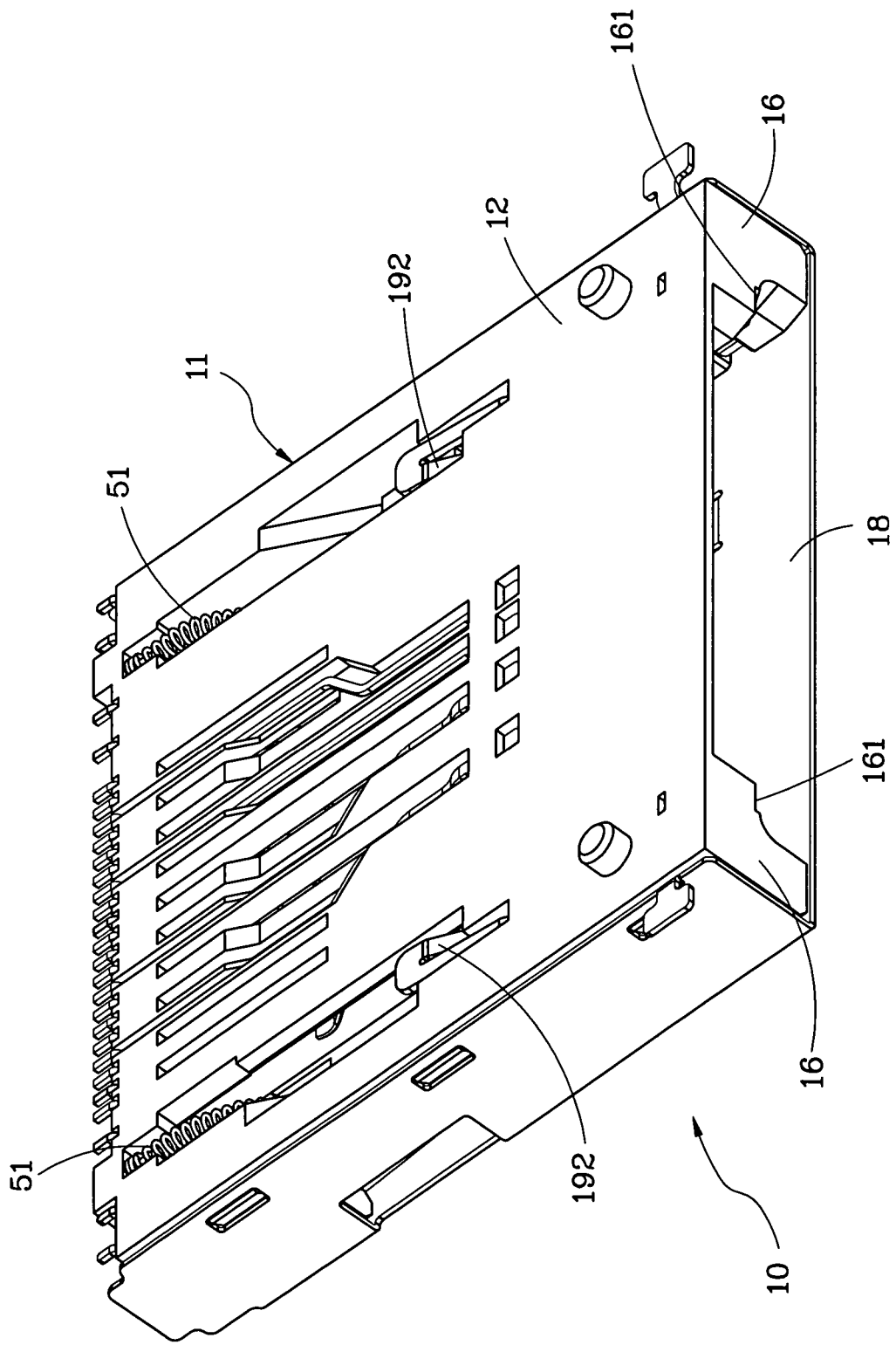
FIG. 3 is an oblique bottom elevation of the multi-in-one card connector in accordance with the present invention.
Figure 4:
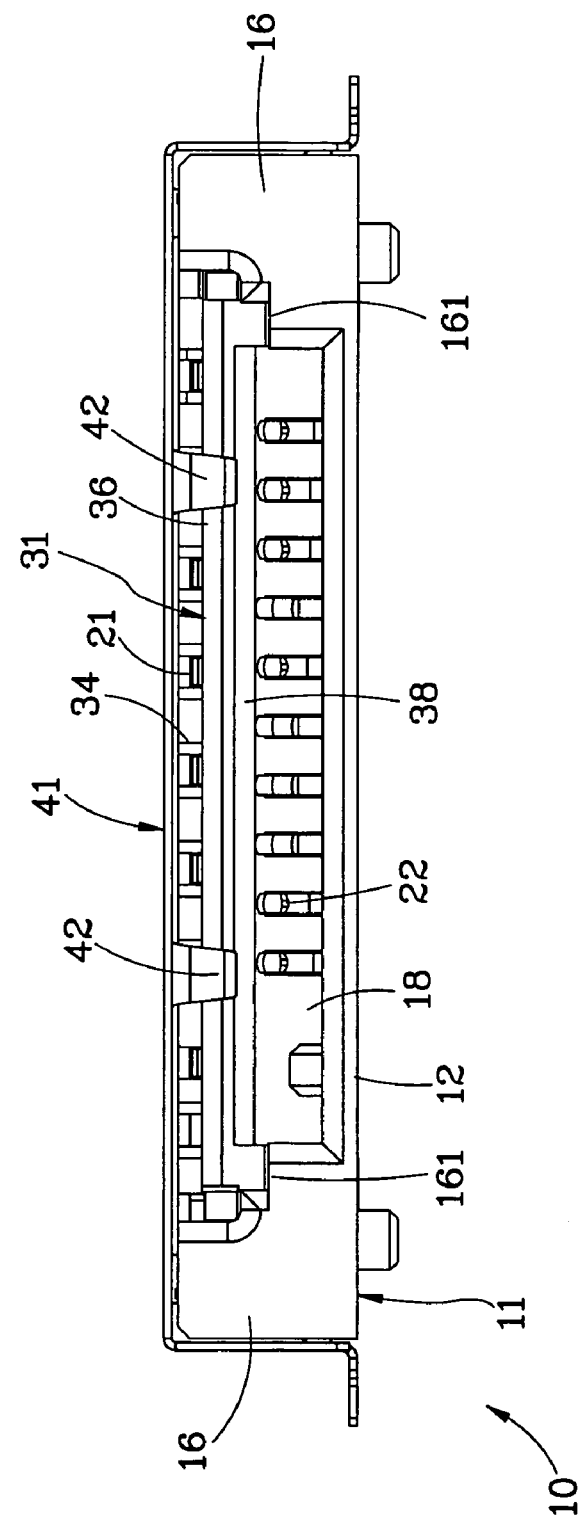
FIG. 4 is a front plain view of the multi-in-one card connector in accordance with the present invention.
Figure 5:
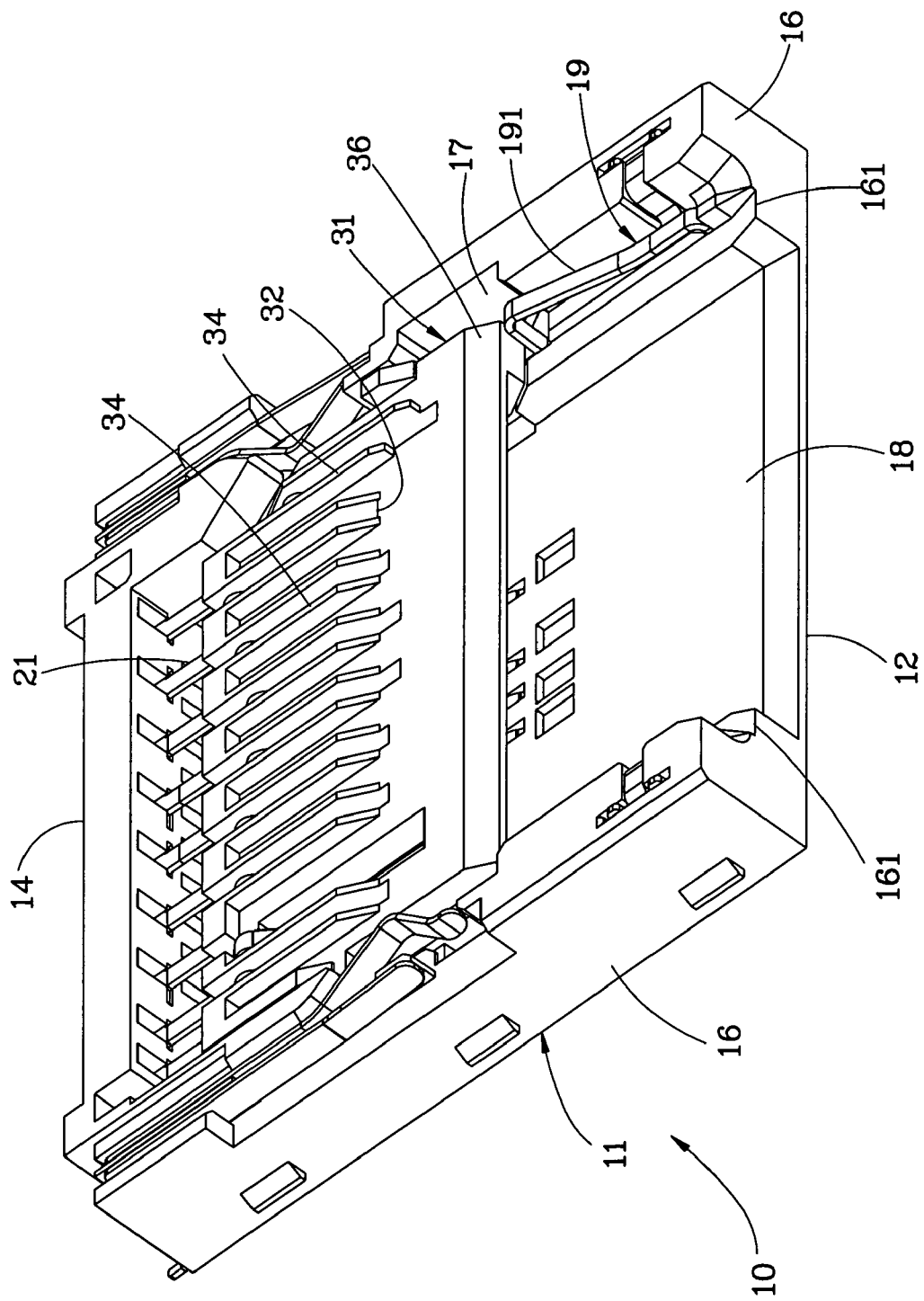
FIG. 5 corresponds to FIG. 1, showing the internal arrangement of the multi-in-one card after removal of the cover plate.
Figure 6:
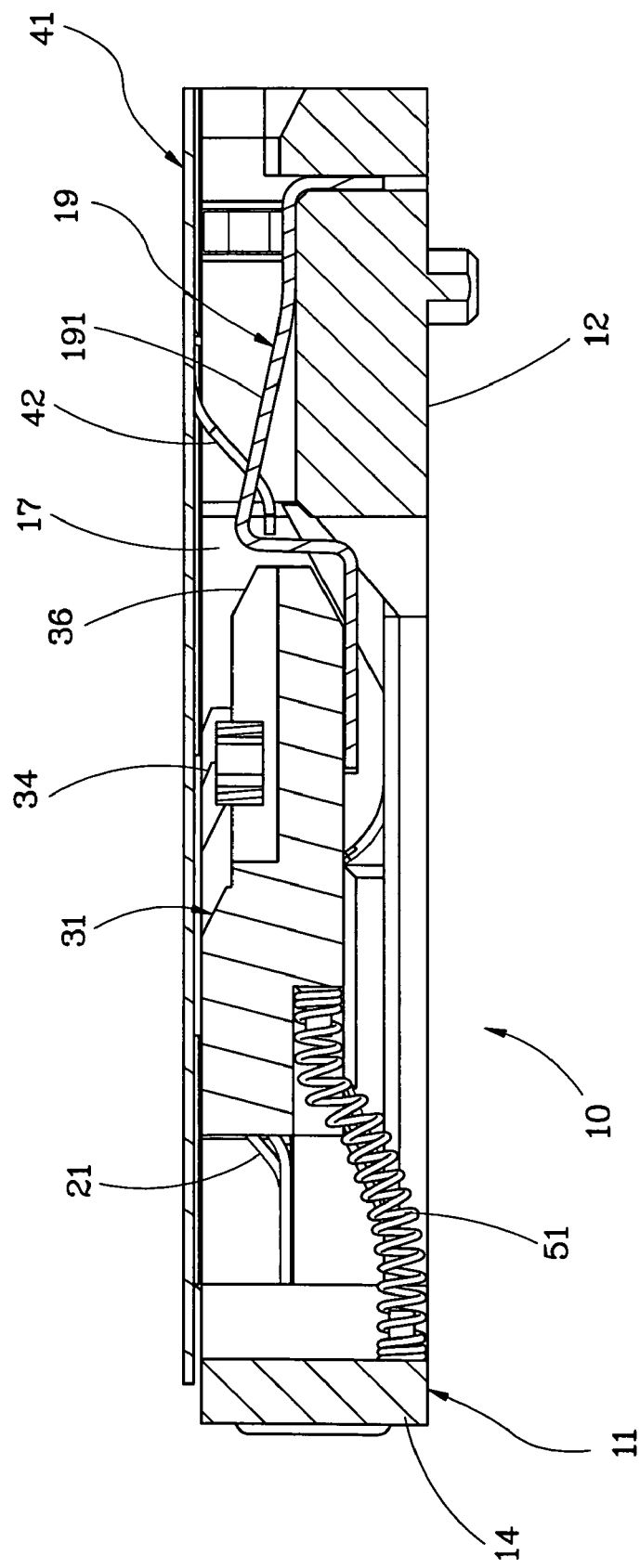
FIG. 6 is a schematic sectional view of the present invention, showing the arrangement of the spring members in the multi-in-one card connector.

Referring to FIGS. 1~7, a multi-in-one card connector 10 in accordance with the present invention is shown comprised of a base 11, two terminal sets 21 and 22, a partition plate 31, a cover plate 41, and two spring members 51.

The base 11 has an upright back wall 14, two upright sidewalls 16 forwardly extending from two ends of the upright back wall 14 in a parallel manner, a front opening 18 defined between the two upright sidewalls 16 through which a card (not shown) is insertable into the inside of the base 11. The upright sidewalls 16 each have a stepped portion 161 facing the front opening 18 for allowing alternative insertion of two different specifications of cards through the front opening 18 into the inside of the base 11, and a sloping groove 17 extending downwardly backwards from a middle part thereof. Further, two spring hooks 19 are respectively installed in the stepped portions 161 of the upright sidewalls 16. Each spring hook 19 has one end affixed to the stepped portion 161 of the associating upright sidewall 16 and the other end terminating in a slanting guide section 191 and then a hooked endpiece 192. The hooked endpieces 192 are vertically movably suspending in the base 11.

The two terminal sets 21 and 22 are respectively fastened to the upright back wall 14 of the base 11 and suspending inside the base 11 at different elevations. The upper terminal set 21 is adapted for the connection of a relatively wider card (for example, a Secure Digital memory card). The lower terminal set 22 is adapted for the connection of a relatively narrower card (for example, a Memory Stick Duo).

The partition plate 31 is movably mounted in the base 11, having a plurality of longitudinal slots 32, a plurality of longitudinal ribs 34 upwardly protruded from its top wall and respectively extending along two opposite lateral sides of each of the longitudinal slots 32, an upper bevel edge 36 transversely disposed at its front side, and a lower bevel edge 38 transversely disposed at its front side and abutted against the upper bevel edge 36. The upper terminal set 21 has its terminals respectively inserted from the bottom side of the partition plate 31 through the longitudinal slots 32 of the partition plate 31. The partition plate 31 is supported on the lower terminal set 22 with its two opposite lateral sides respectively positioned in the sloping grooves 17 of the upright sidewalls 16 so that the partition plate 31 is movable upwardly forwards and downwardly backwards along the sloping grooves 17. The partition plate 31 further has two hook holes 39 bilaterally disposed at its bottom wall near its front side. When the partition plate 31 is at the upper limit position, the hooked endpieces 192 of the spring hooks 19 are respectively hooked in the hook holes 39.

The cover plate 41 is covered on the base 11. The cover plate 41 has two spring strips 42 downwardly backwardly extending toward the inside the base 11. The bottom edge of each spring strip 42 is disposed in proximity to the front side of the partition plate 31 when the partition plate 31 is in the upper limit position.

The two spring members 51 are compression springs connected between the partition plate 31 and the upright back wall 14 of the base 11 to impart a forward pressure to the partition plate 31.

The operation of the present invention is outlined hereinafter.

Referring to FIG. 7, before insertion of a card, the spring force of the two spring members 51 pushes the partition plate 31 upwardly forwards along the sloping grooves 17 of the upright sidewalls 16, supporting the partition plate 31 in the upper limit position. At this time, the lower terminal set 22 supports the partition plate 31 in the upper limit position, and the longitudinal ribs 34 of the partition plate 31 are stopped against the bottom side of the cover plate 41.

Referring to FIG. 8 and FIG. 7 again, when inserting a MS Duo (Memory Stick Duo) card 91 into the multi-in-one card connector 10, the spring strips 42 impart a downward pressure to the MS Duo card 91, and the lower bevel edge 38 of the partition plate 31 guides the MS Duo card 91 toward the inside of the base 11 beneath the partition plate 31 into contact with the lower terminal set 22. At this time, the partition plate 31 is disposed at the top side of the MS Duo card 91 to stop insertion of another card into the multi-in-one card connector 10.

Further, if the MS Duo card 91 is forced against the spring strips 42 toward the space above the partition plate 31 during insertion of the MS Duo card 91, the hooked endpieces 192 of the spring hooks 19 are respectively hooked in the hook holes 39, prohibiting downward movement of the partition plate 31, and therefore the MS Duo card 91 is prohibited from insertion into the space above the partition plate 31. During ejection of the inserted MS Duo card 91, the user can directly pull the MS Duo card 91 out of the multi-in-one card connector 10.

Figure 9:
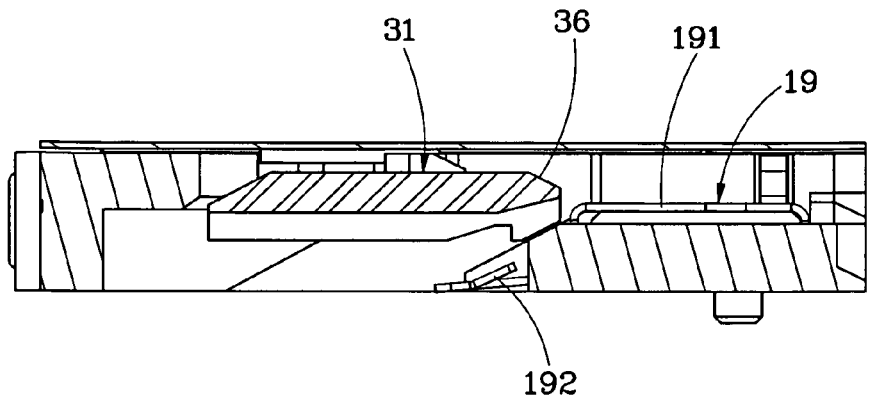
FIG. 9 is a schematic sectional view of the present invention, showing the spring hooks disengaged from the partition plate.
Figure 10:
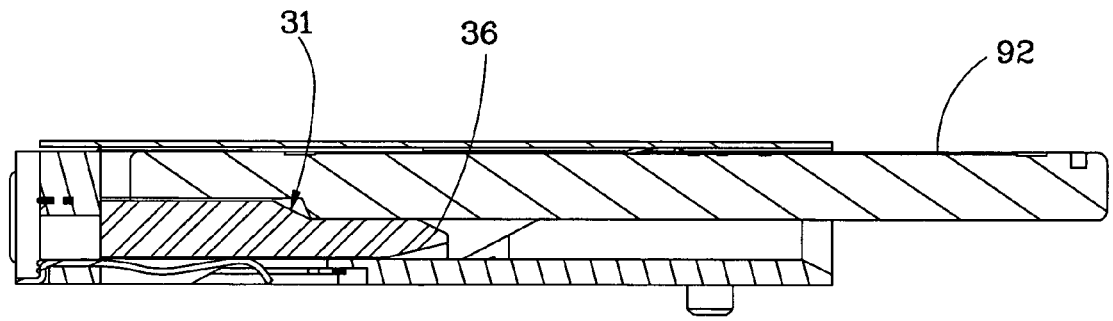
FIG. 10 is a schematic sectional view of the present invention, showing a SD card inserted into the multi-in-one card connector.
Figure 11:
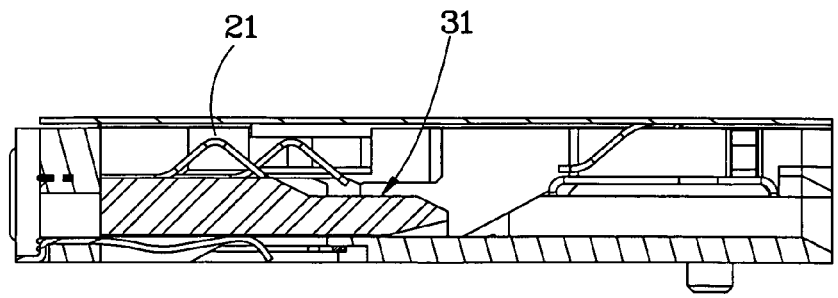
FIG. 11 is a schematic sectional view of the present invention, showing the partition plate lowered to the bottom side inside the base.
Figure 12:
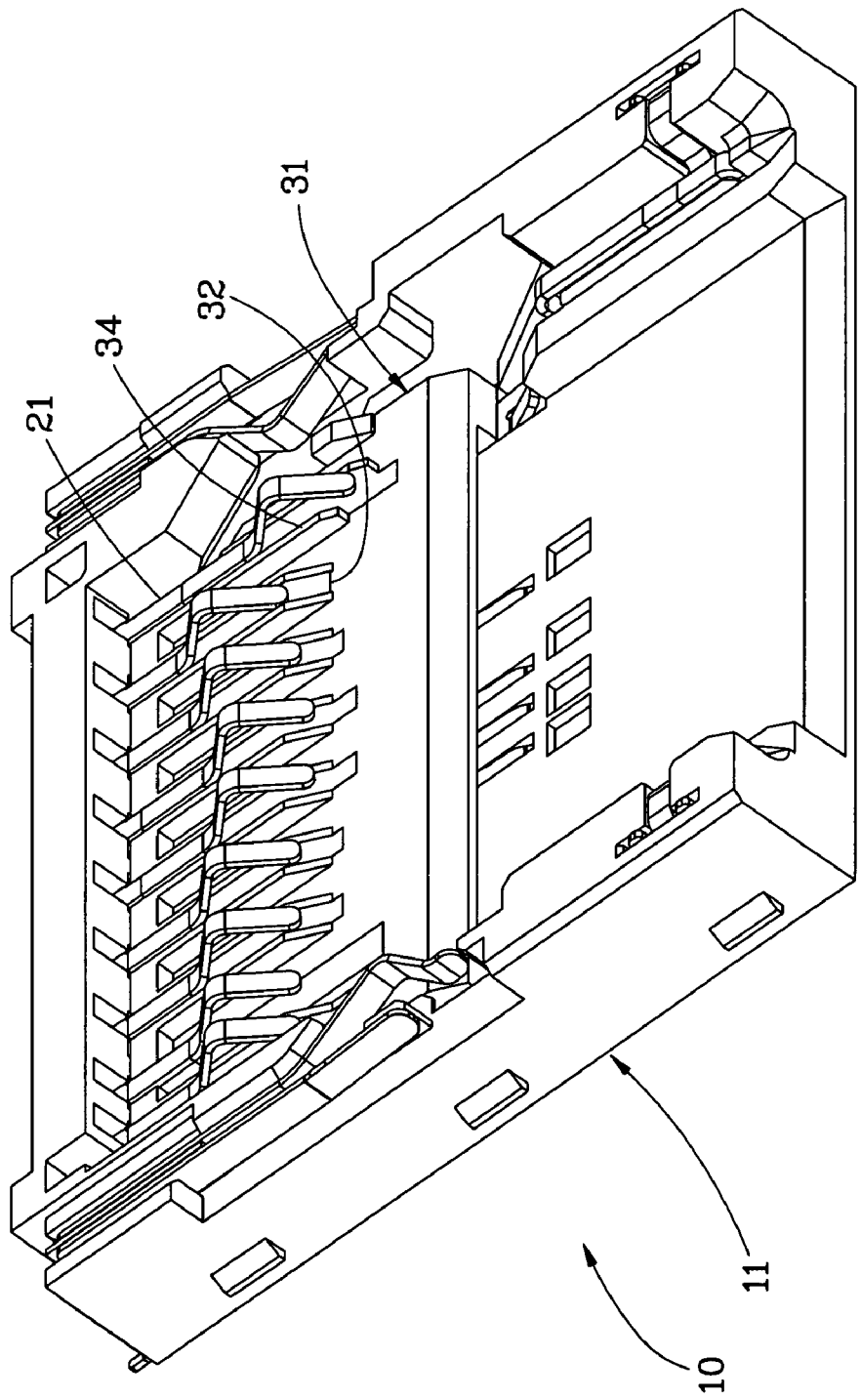
FIG. 12 is similar to FIG. 5 but showing the partition plate lowered to the bottom side inside the base.

Referring to FIGS. 9 and 10 and FIGS. 5 and 7 again, when inserting a SD (Secure Digital) memory card 92 into the multi-in-one card connector 10, the SD memory card 92 will be guided by the stepped portions 161 (see FIG. 5) into the upper part of the front opening 18 to force the spring strips 42 upwards away and to force the slanting guide section 191 of the spring hooks 19 downwards, thereby disengaging the hooked endpieces 192 of the spring hooks 19 from the hook holes 39, as shown in FIG. 9, and therefore the partition plate 31 is unlocked. Continuously inserting the SD memory card 92 causes the front edge of the SD memory card 92 to be stopped against the upper bevel edge 36 of the partition plate 31, and therefore the SD memory card 92 immediately pushes the partition plate 31 downwardly backwards to the position shown in FIG. 10 for allowing the SD memory card 92 to be inserted into position. At the same time, the upper terminal set 21 protrudes over the longitudinal slots 32 (see FIGS. 11 and 12) for the contact of the inserted the SD memory card 92. Further, the longitudinal ribs 34 of the partition plate 31 support the upper terminal set 21 in positive contact with the inserted the SD memory card 92. At this time, the partition plate 31 is disposed beneath the SD memory card 92 to prohibit insertion of another card into the multi-in-one card connector 10. During ejection of the inserted SD memory card 92, the user can directly pull the SD memory card 92 out of the multi-in-one card connector 10. After removal of the SD memory card 92 from the multi-in-one card connector 10, the spring members 51 immediately push the partition plate 31 back to the upper limit position to have the hook holes 39 be forced into engagement with the hooked endpieces 192 of the spring hooks 19, and therefore the multi-in-one card connector 10 is returned to the status shown in FIG. 7.

As stated above, the partition plate of the present invention prohibits insertion of a second card member into the multi-in-one card connector. After insertion of one card member into the multi-in-one card connector, the partition plate is shifted to the other space to prohibit insertion of another card member. Further, the downwardly backwardly sloping motion of the partition plate facilitates locking of the spring hooks, and the spring hooks can be disengaged from the locking position by only one type of card. Therefore, the partition plate can be selectively locked, preventing an error.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multi-in-one card connector comprising:
   a base, said base comprising two upright sidewalls and a front insertion opening defined between said upright sidewalls, said upright sidewalls each having at least one stepped portion;
   at least two terminal sets respectively mounted inside said base at different elevations;
   a partition plate mounted in and movable inside said base; and
   a cover plate covering said base;
   wherein:
   said upright sidewalls of said base each have a downwardly backwardly extending sloping groove for guiding movement of said partition plate inside said base, and the stepped portions of said base define said front opening of said base into at least two entrances for the insertion of at least two different specifications of card members into said base;
   said partition plate is set between two vertically spaced terminals sets of said at least two terminal sets, having two opposite side edges respectively supported in the downwardly backwardly extending sloping grooves of said upright sidewalls of said base to guide movement of said partition plate forwards and backwards relative to said base between an upper limit position and a lower limit position, said partition plate moving both in a backwards direction and a downwards direction from said upper limit position to said lower limit position upon insertion of a card into an upper part of said front opening defined by said stepped portions of said base, said backwards direction being a card insertion direction;

two spring members are connected between said partition plate and said base to impart a forward pressure to said partition plate and maintain said partition plate at said upper limit position when said partition plate is not being moved backwards and downwards by an inserted card towards said lower limit position.

2. The multi-in-one card connector as claimed in claim 1, wherein said base has an upright back wall; and said terminal sets are respectively fastened to said upright back wall of said base and suspended inside said base at different elevations.

3. The multi-in-one card connector as claimed in claim 1, wherein the downwardly backwardly extending sloping groove of each of said upright sidewalls of said base extends downwardly backwardly from a top side of a middle part an associated upright sidewall toward a rear side of the associated upright sidewall.

4. The multi-in-one card connector as claimed in claim 2, wherein said spring members are connected between the upright back wall of said base and a part of said partition plate.

5. The multi-in-one card connector as claimed in claim 1, wherein said partition plate comprises two spring strips sloping downwardly backwards toward the inside of said base, said spring strips each having a rear bottom side disposed in proximity to a front edge of said partition plate when said partition plate is in said upper limit position.

6. The multi-in-one card connector as claimed in claim 1, wherein said partition plate has a bottom side supported on one of said terminals sets.

7. The multi-in-one card connector as claimed in claim 1, wherein said partition plate comprises a plurality of longitudinal slots, which receive one of said terminal sets that is disposed at the top side.

8. The multi-in-one card connector as claimed in claim 7, wherein said partition plate comprises a plurality of longitudinal ribs respectively upwardly protruded from a top side thereof and respectively extending along two opposite lateral sides of each of said longitudinal slots.

9. The multi-in-one card connector as claimed in claim 1, wherein said partition plate comprises two hook holes bilaterally disposed at a bottom wall near a front side thereof; said two upright sidewalls of said base each have a spring hook installed therein, said spring hook having one end fastened to the associated upright sidewall and an opposite end terminating in a slanting guide section and then a hooked endpiece; and the hooked endpieces of the spring hooks of said upright sidewalls are respectively hooked in the hook holes of said partition plate when said partition plate is in said upper limit position.

10. The multi-in-one card connector as claimed in claim 1, wherein said partition plate has an upper bevel edge and a lower bevel edge transversely disposed at a front side thereof and abutted against each other, said lower bevel edge cooperating with said downwardly backwardly extending sloping groove to guide said movement of said partition plate from said upper limit position to said lower limit position.

* * * * *